(12) United States Patent
Nakata

(10) Patent No.: US 6,506,974 B2
(45) Date of Patent: Jan. 14, 2003

(54) ANTI-NOISE GROMMET

(75) Inventor: Hiroyuki Nakata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 36 days.

(21) Appl. No.: 09/860,502

(22) Filed: May 21, 2001

(65) Prior Publication Data

US 2001/0045298 A1 Nov. 29, 2001

(30) Foreign Application Priority Data

May 23, 2000 (JP) ........................................ 2000-150952

(51) Int. Cl.$^7$ ................................................ H02G 3/18
(52) U.S. Cl. ................ 174/65 G; 174/135; 174/153 G; 248/56; 16/2.1
(58) Field of Search .......................... 174/65 G, 153 G, 174/152 G, 152 R, 135, 151; 16/2.1, 2.2; 248/56; 439/604

(56) References Cited

U.S. PATENT DOCUMENTS

| 4,685,173 | A | | 8/1987 | Pavur |
| 5,981,877 | A | | 11/1999 | Sakata et al. |
| 6,088,874 | A | | 7/2000 | Nakata et al. |
| 6,147,307 | A | * | 11/2000 | Ling et al. ................. 248/56 X |
| 6,150,607 | A | * | 11/2000 | Weyl et al. ................ 174/65 G |
| 6,211,465 | B1 | * | 4/2001 | Streit ........................ 174/65 G |
| 6,278,060 | B1 | * | 8/2001 | Mori ................... 174/153 G X |
| 6,372,986 | B1 | * | 4/2002 | Saeki et al. ............... 174/65 G |

FOREIGN PATENT DOCUMENTS

| JP | 57-193282 | 6/1956 |
| JP | 60-07614 | 5/1985 |
| JP | 1-124612 | 8/1989 |
| JP | 5-90749 | 12/1993 |
| JP | 7-282666 | 10/1995 |
| JP | 9-289724 | 11/1997 |
| JP | 10302563 | 11/1998 |

OTHER PUBLICATIONS

English Language abstract of JP–9–289724.
English Language abstract of JP–7–282666.
English Language abstract of JP–10–302563.

* cited by examiner

*Primary Examiner*—Anthony Dinkins
*Assistant Examiner*—Dhiru R Patel
(74) *Attorney, Agent, or Firm*—Greenblum & Bernstein, P.L.C.

(57) ABSTRACT

An anti-noise grommet includes an inner cylindrical member and an outer cylindrical member. The outer cylindrical member includes a round leg portion extending from one end thereof, a flared oval portion extending sequentially from the round leg portion and an oval flange portion further extending sequentially from the flared oval portion. The flared oval portion and oval flange portion are divided by a peripheral slot. The anti-noise grommet further includes an oval ring portion linking the oval flange portion of the outer cylindrical member to the inner cylindrical member. The oval ring portion includes stretched oval sections and arched oval sections. Each of the stretched oval sections of the oval ring portion includes a central zone extending from the inner cylindrical member to the outer cylindrical member, and this central zone is made thicker than the remaining area.

20 Claims, 4 Drawing Sheets

ANTI-NOISE GROMMET

BACKGROUND OF THE INVENTION

1. Field of the Invention

The invention relates to a grommet of the type fitted around a wire harness and mounted into a panel hole provided in a body panel of a vehicle e.g. an automobile.

2. Description of Background Information

When a wire harness is to be wired from an engine compartment into a passenger compartment, the wire harness is fitted into a grommet made of a rubber or an elastomer, and the grommet together with the harness are passed into a panel hole provided in a partition panel, i.e. a bulkhead, that divides the engine compartment from the passenger compartment. The grommet is thus fitted against the peripheral rim of the panel hole, so that water or dust produced from the engine compartment is prevented from entering into the passenger compartment.

The grommet is therefore made so as to conform with the shape of the panel hole. When the panel hole 3 has an oval shape as shown in FIG. 1A, the grommet used for this panel hole 3 is preferably a cylindrical piece having a cross-section of the same oval shape (oval cylindroid). However, as such a grommet includes stretched oval sections, these parts tend to be deformed toward the inside of the panel hole 3.

To solve such a problem, the enlarged end portion 1a of the grommet 1 may be supported by inside ribs 1b (FIGS. 1B and 1C) as disclosed in Japanese Utility Model published under No. HEI 1-124 612.

In this manner, the deformation in the stretched oval sections of the grommet 1 may be avoided, thereby preventing an air gap from being formed between the grommet 1 and the panel hole 3. The ingress of water and dust into the passenger compartment can thus be prevented.

However, there have been recently raised problems of noise, as the noise generated in the engine compartment is transmitted into the passenger compartment through the panel hole. There is now a great need for reducing such noise. However, a structure such as a grommet supported by ribs shown in FIGS. 1B and 1C cannot solve noise nuisance problems.

The present invention has therefore been contemplated to solve such problems, and provide an oval-shaped anti-noise grommet, the stretched oval sections of which are designed to avoid being deformed, so that the sealing quality of the grommet is improved, and the noise produced in the engine compartment is effectively sealed off.

SUMMARY OF THE INVENTION

To this end, there is provided an anti-noise grommet formed unitarily and in one piece of a suitable elastomer, for example, a rubber, configured to be fitted around a wire harness and mounted into a panel hole with a peripheral rim provided in a vehicle body panel. The anti-noise grommet has a longitudinal axis and a radial direction substantially perpendicular thereto.

The anti-noise grommet includes an inner cylindrical member and an outer cylindrical member. The outer cylindrical member has a small-diameter portion and a larger diameter oval portion sequentially extending therefrom, the outer cylindrical member being mounted concentrically around the inner cylindrical member, thereby forming a first grommet end with the small-diameter portion and a second grommet end with the larger-diameter oval portion.

The anti-noise grommet further includes an oval ring portion including stretched oval sections and arched oval sections, the oval ring portion linking the inner cylindrical member to the outer cylindrical member in the radial direction of the anti-noise grommet at or near the second grommet end.

Each of the stretched oval sections then includes a circumferential central zone and a remaining stretched zone both extending in the radial direction, and the circumferential central zone has a thickness greater than the remaining stretched zone and arched oval sections.

Preferably, the small-diameter portion of the outer cylindrical member includes a round leg portion extending from the first grommet end along the axis, the larger-diameter oval portion includes a flared oval portion extending sequentially from the round leg portion and an oval flange portion extending further sequentially from the flared oval portion, and the oval ring portion links the oval flange portion to the inner cylindrical member.

Preferably yet, the radial direction of the oval ring portion is inclined towards the first grommet end as it extends away from the axis of the anti-noise grommet towards the outer cylindrical member.

Typically, the circular external face of the flared oval portion and oval flange portion is divided by a peripheral slot configured to engage with the peripheral rim of the panel hole.

Suitably, the oval flange portion includes stretched oval sections with a first thickness and arched oval sections with a second thickness, and the stretched oval sections respectively include a circumferential central zone extending along the axis of the anti-noise grommet. The first thickness is greater than the second thickness, and is gradually increased from the arched oval sections towards the circumferential central zone of the stretched oval sections.

More suitably, the first grommet end is configured to be closed with a wire harness by using a closing device, so as to form a closed air gap space.

As the stretched oval sections of the anti-noise grommet are susceptible to receive deformation pressure, that zone of the oval ring portion extending from the circumferential central point of the stretched oval sections to the inner cylindrical member may be reinforced by increasing its thickness. Accordingly, the reinforced zone serves as a support against compressive forces, thus relieving the strain on the outer cylindrical member and maintaining the sealing quality of the anti-noise grommet.

Additionally, when a wire harness is passed through the inner cylindrical member, the wire harness may dilate the latter and press the outer cylindrical member strongly outwardly through the reinforced zone. As a result, the peripheral slot provided in the outer cylindrical member is more firmly engaged with the peripheral rim of the panel hole. The sealing quality of the anti-noise grommet in thus further improved.

Further, the stretched oval sections of the oval flange portion in the outer cylindrical member are made thicker than the arched oval sections. In addition, in the stretched oval sections, the circumferential central zone is made thicker than the remaining zone.

By virtue of this configuration, the outer cylindrical member itself is also reinforced through its stretched oval sections. Deformations in these sensitive sections are thus more reliably prevented.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1A:
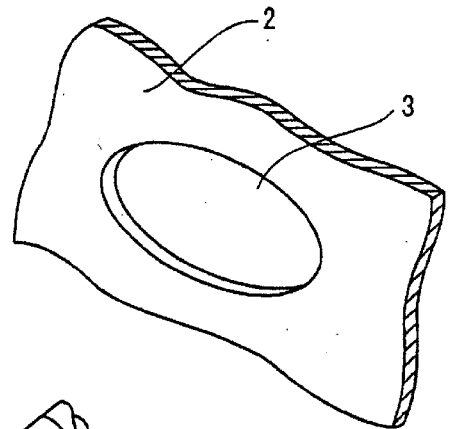
FIG. 1A is a perspective view of a panel hole provided in a vehicle body panel.
Figure 1B:
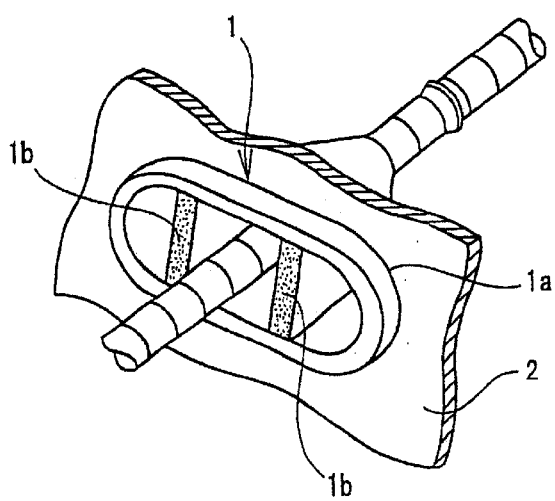
FIG. 1B is a perspective view of an example of known grommets.
Figure 1C:
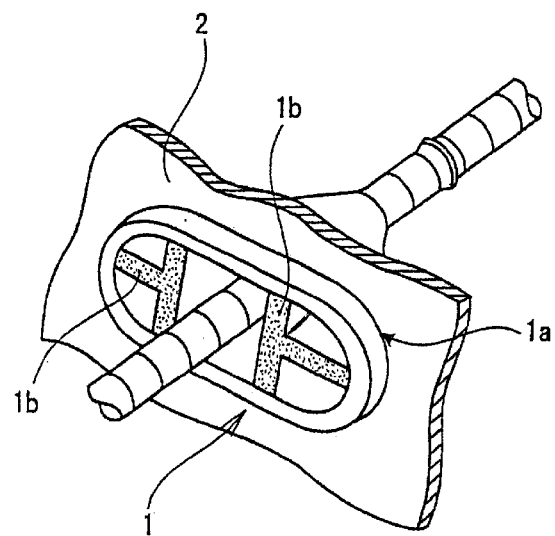
FIG. 1C is a perspective view of another example of known grommets.
Figure 2A:
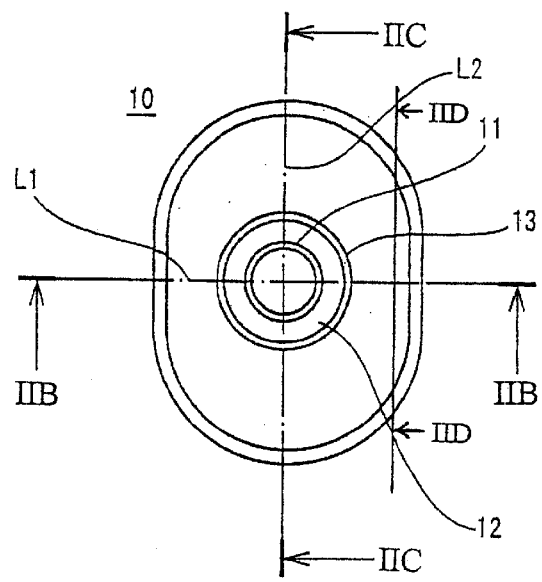
FIG. 2A is an axial view of a grommet in accordance with the present invention.
Figure 2B:
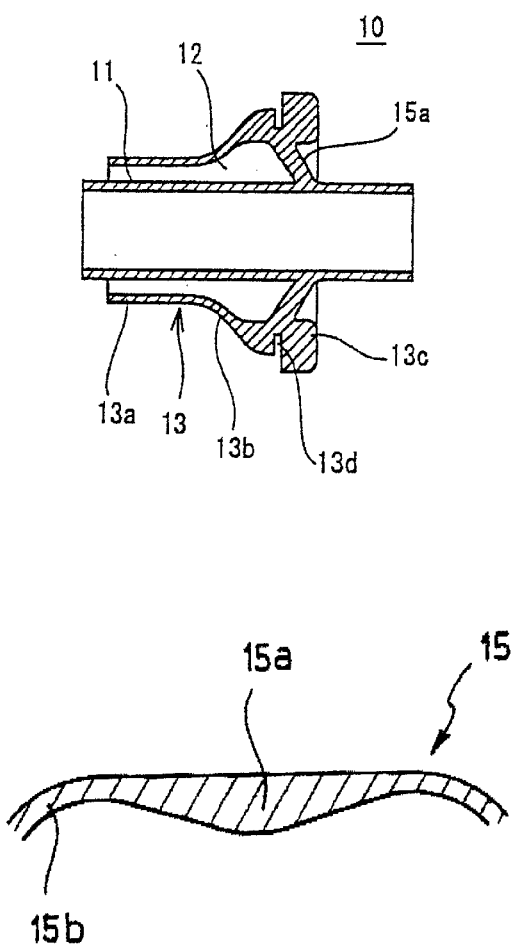
FIG. 2B is a cross-sectional view of the grommet of FIG. 2A, taken along line IIB.
Figure 2C:
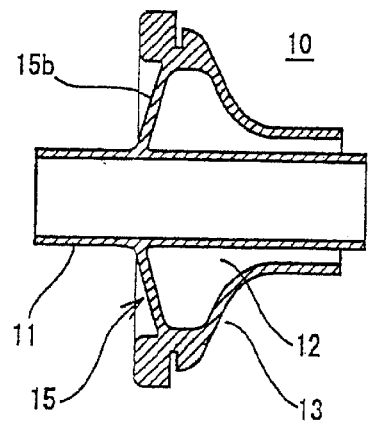
FIG. 2C is a cross-sectional view of the grommet of FIG. 2A, taken along line IIC.
Figure 2D:
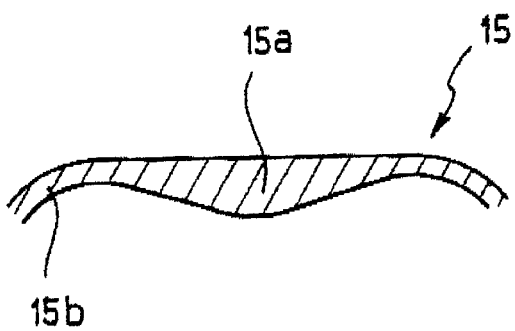
FIG. 2D is a schematic cross-sectional view of one of the stretched oval sections (corresponding to the right-hand side of line IID in FIG. 2A) of an oval ring portion according to the present invention.
Figure 3:
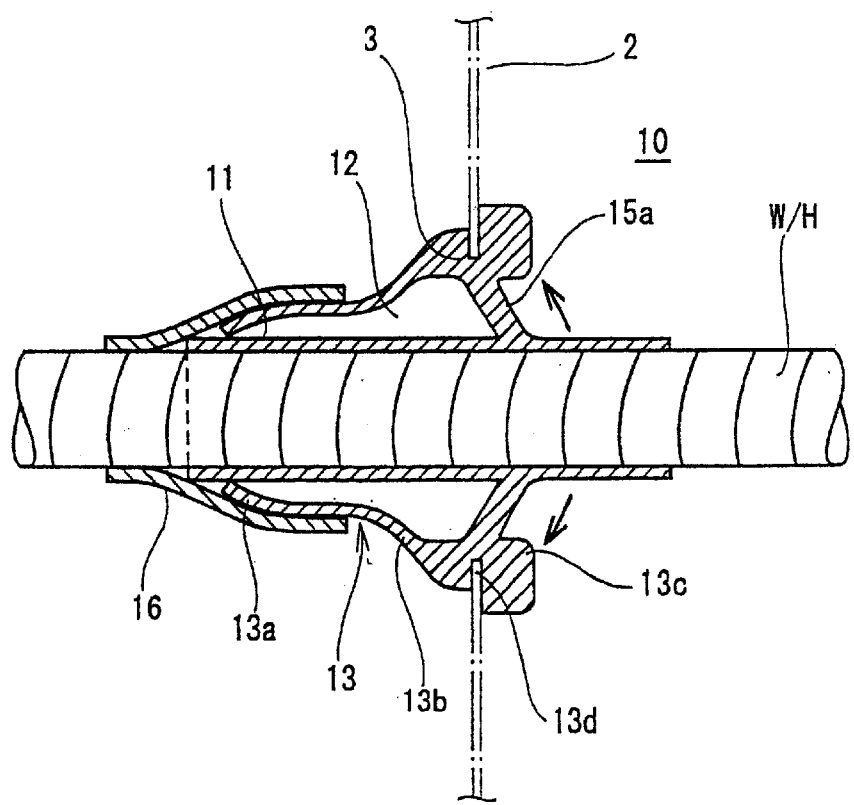
FIG. 3 is a cross-sectional side view of the inventive grommet, when a wire harness is passed therethrough.

FIGS. 2 and 3 show an anti-noise grommet according to a first embodiment of the present invention. The anti-noise grommet 10 is formed unitarily and in one piece of a suitable elastomer, such as rubber.

The anti-noise grommet 10 includes an inner cylindrical member 11 having the same diameter along the longitudinal axis of the anti-noise grommet, and an outer cylindrical member 13 having sequentially different diameters. The outer cylindrical 13 is provided on the inner cylindrical member 11, thereby forming an anti-noise space 12 therebetween.

The outer cylindrical member 13 includes a round leg portion 13a extending from one end thereof along the longitudinal axis of the anti-noise grommet, a flared oval portion 13b extending sequentially from the leg portion 13a farther along the axis, and an oval flange portion 13c extending sequentially from the flared portion 13b farther along the longitudinal axis, up to the other end of the outer cylindrical member 13. A circular peripheral section dividing the flared oval portion 13b and the oval flange portion 13c is provided with a peripheral slot 13d for hooking on a body panel.

The oval flange portion 13c in the outer cylindrical member 13 forms an inner oval face. A circumferential section of the inner oval face is linked to a corresponding circumferential section of the outer circular face of the inner cylindrical member 11 through an oval ring portion 15. The oval ring portion 15 thus has first and second faces with a given thickness therebetween, and includes an oval-shaped peripheral rim with two stretched oval sides (adjacent the cross points with line IIB—IIB in FIG. 2A), and an internal round rim. At least the first face of the oval ring portion 15 includes a reinforced zone 15a, at the positions corresponding to stretched oval sections, which has a greater thickness than the other zone 15b of the stretched oval sections and the arched oval sections of the oval ring portion 15. The reinforced zone 15a is made gradually thicker from the arched oval sections (adjacent the cross points with line IIC—IIC in FIG. 2A) to the circumferential central zone (cross points with line L1 in FIG. 2A) of the stretched oval sections (adjacent the cross points with line IIB—IIB in FIG. 2A). The thickness at the circumferential central zone is about two to three times that of the arched oval sections which cross with line L2 (FIG. 2A).

In addition, the radial direction of the oval ring portion 15 is preferably inclined toward the first grommet end as it extends away from the longitudinal axis of the anti-noise grommet toward the outer cylindrical member. In this manner, the anti-noise grommet is rendered mechanically stronger, and elastic restitution forces of the oval ring portion allow the circular slot 13d to fit more snugly with the peripheral rim of the panel hole.

The reinforced zone 15a of the oval ring portion 15 prevents the stretched oval sections of the oval flange portion 13c of the outer cylindrical member 13 from being inwardly deformed. Accordingly, the peripheral slot 13d can remain hermetically fitted with the peripheral rim of the panel hole, not only in the oval arched sections of the anti-noise grommet, but also in the stretched oval sections thereof.

Further, as shown in FIG. 3, when a wire harness (WH) is passed through the inner cylindrical member 11, the inner cylindrical member 11 is enlarged and presses the oval ring portion 15 outwardly from inside. As a result, the reinforced zone 15a strongly supports the stretched oval sections of the outer cylindrical member 13, and prevents the stretched oval sections from undergoing an inward strain.

After the wire harness (WH) is passed through the inner cylindrical member 11, one end of the round leg portion 13a of the outer cylindrical member 13 extends around the inner cylindrical member 11, and is closed by a suitable covering device, for example, an adhesive tape, so that an air gap 12 is formed between the inner and outer cylindrical members 11 and 13. This air gap 12 serves as an anti-noise space. Noise produced in the engine compartment is attenuated in this air gap, and is effectively closed off from the passenger compartment.

Figure 4:
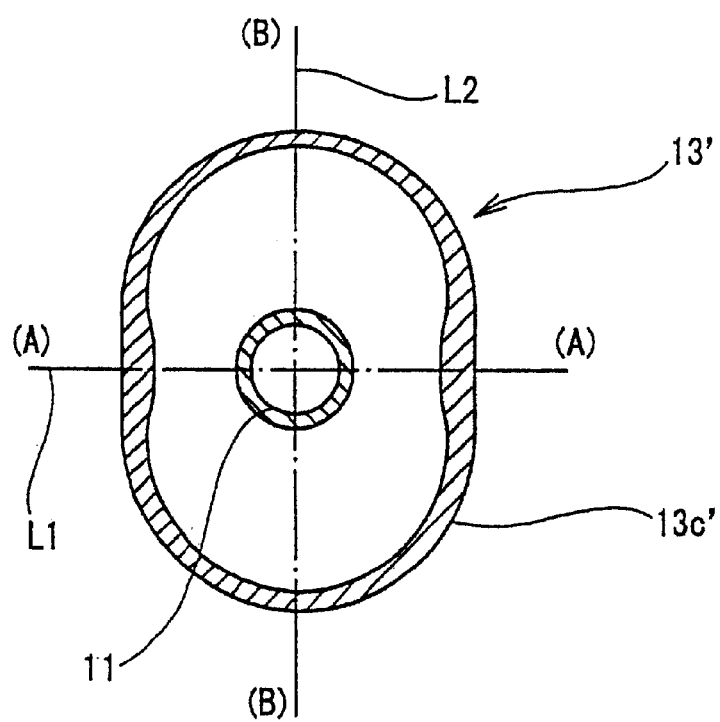
FIG. 4 is a cross-sectional view of the oval flange portion according to a second embodiment of the invention.

FIG. 4 shows a second embodiment of the invention, in which the stretched oval sections of the oval flange portion 13c and flared oval portion 13b of the outer cylindrical member 13 are made thicker than the arched oval sections thereof. Further, the thickness is gradually increased from the arched oval sides towards the circumferential central zones (points crossing with line L1 in FIG. 4) of the stretched oval sections.

Thus, the stretched oval sections of the outer cylindrical member 13 are not only protected by the above configuration, but also by the reinforced section 15a of the oval ring portion 15. This double protection further reinforces the resistance of the grommet against the inward deformation of its stretched oval sections.

Moreover, anti-noise quality can be improved by increasing the thickness of the outer cylindrical member 13.

As can be understood from above, the oval-shaped, anti-noise grommet of the invention includes an oval ring portion binding an outer cylindrical member to an inner cylindrical member. The oval ring portion includes stretched oval sections, and has first and second faces with a thickness portion between them. The stretched oval sections of the oval ring portion are made thicker than the other sections including the arched oval sections. In this manner, the stretched oval sections of the oval ring portion can protect the outer cylindrical member from inward deformation. As a result, the oval-shaped, anti-noise grommet has a better sealing quality. Further, an air gap formed in the double cylinder structure improves the anti-noise quality of the grommet.

In addition to the above-mentioned stretched oval sections of the oval ring structure, those of the outer cylindrical member are likewise made thicker than the other sections including the arched oval sections. The outer cylindrical member is thus further reinforced against inward deformation. Consequently, the sealing and anti-nose qualities of the grommet is further improved.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Patent Application No. 2000-150952, filed on May 23, 2000, which is herein expressly incorporated by reference in its entirety.

What is claimed:

1. An anti-noise grommet configured to be fitted around a wire harness and mounted into a panel hole with a peripheral rim provided in a vehicle body panel, said anti-noise grommet having a longitudinal axis and a radial direction substantially perpendicular thereto;

said anti-noise grommet comprising an inner cylindrical member and an outer cylindrical member, said outer cylindrical member comprising a small-diameter portion and a larger diameter oval portion sequentially extending therefrom, said outer cylindrical member being mounted concentrically around said inner cylindrical member, thereby forming a first grommet end with said small-diameter portion and a second grommet end with said larger-diameter oval portion;

said anti-noise grommet further comprising an oval ring portion including stretched oval sections and arched oval sections, said oval ring portion linking said inner cylindrical member to said outer cylindrical member in said radial direction of said anti-noise grommet at or near said second grommet end;

each of said stretched oval sections comprising a circumferential central zone and a remaining stretched zone both extending in said radial direction, said circumferential central zone having a thickness greater than said remaining stretched zone and arched oval sections.

2. The anti-noise grommet according to claim 1, wherein said small-diameter portion of said outer cylindrical member comprises a round leg portion extending from said first grommet end along said longitudinal axis, said larger-diameter oval portion comprising a flared oval portion extending sequentially from said round leg portion and an oval flange portion extending further sequentially from said flared oval portion, and said oval ring portion links said oval flange portion to said inner cylindrical member.

3. The anti-noise grommet according to claim 2, wherein said radial direction of said oval ring portion is inclined toward said first grommet end as it extends from said axis of said anti-noise grommet towards said outer cylindrical member.

4. The anti-noise grommet according to claim 3, wherein a peripheral external face of said flared oval portion and oval flange portion is divided by a peripheral slot adapted to engage with said peripheral rim of said panel hole.

5. The anti-noise grommet according to claim 4, wherein said oval flange portion comprises stretched oval sections with a first thickness and arched oval sections with a second thickness, said stretched oval sections respectively include a circumferential central zone extending along said axis of said anti-noise grommet, said first thickness is greater than said second thickness, and said first thickness is gradually increased from said arched oval sections toward said circumferential central zone of said stretched oval sections.

6. The anti-noise grommet according to claim 4, said grommet is formed unitarily and in one piece from a suitable elastomer.

7. The anti-noise grommet according to claim 6, wherein said elastomer comprises rubber.

8. The anti-noise grommet according to claim 2, wherein a peripheral external face of said flared oval portion and oval flange portion is divided by a peripheral slot adapted to engage with said peripheral rim of said panel hole.

9. The anti-noise grommet according to claim 8, wherein said oval flange portion comprises stretched oval sections with a first thickness and arched oval sections with a second thickness, said stretched oval sections respectively include a circumferential central zone extending along said axis of said anti-noise grommet, said first thickness is greater than said second thickness, and said first thickness is gradually increased from said arched oval sections toward said circumferential central zone of said stretched oval sections.

10. The anti-noise grommet according to claim 8, wherein said grommet is formed unitarily and in one piece from a suitable elastomer.

11. The anti-noise grommet according to claim 10, wherein said elastomer comprises rubber.

12. The anti-noise grommet according to claim 2, wherein said oval flange portion comprises stretched oval sections with a first thickness and arched oval sections with a second thickness, said stretched oval sections respectively include a circumferential central zone extending along said axis of said anti-noise grommet, said first thickness is greater than said second thickness, and said first thickness is gradually increased from said arched oval sections toward said circumferential central zone of said stretched oval sections.

13. The anti-noise grommet according to claim 12, wherein said first grommet end is configured to be closed with a wire harness by using a closing device, so as to form a closed air gap.

14. The anti-noise grommet according to claim 3, wherein said oval flange portion comprises stretched oval sections with a first thickness and arched oval sections with a second thickness, said stretched oval sections respectively include a circumferential central zone extending along said axis of said anti-noise grommet, said first thickness is greater than said second thickness, and said first thickness is gradually increased from said arched oval sections toward said circumferential central zone of said stretched oval sections.

15. The anti-noise grommet according to claim 2, wherein said first grommet end is configured to be closed with a wire harness by using a closing device, so as to form a closed air gap.

16. The anti-noise grommet according to claim 1, wherein said radial direction of said oval ring portion is inclined toward said first grommet end as it extends away from said axis of said anti-noise grommet towards said outer cylindrical member.

17. The anti-noise grommet according to claim 16, wherein said first grommet end is configured to be closed with a wire harness by using a closing device, so as to form a closed air gap.

18. The anti-noise grommet according to claim 1, wherein said grommet is formed unitarily and in one piece from a suitable elastomer.

19. The anti-noise grommet according to claim 18, wherein said elastomer comprises rubber.

20. The anti-noise grommet according to claim 1, wherein said first grommet end is configured to be closed with a wire harness by using a closing device, so as to form a closed air gap.

* * * * *

UNITED STATES PATENT AND TRADEMARK OFFICE
CERTIFICATE OF CORRECTION

PATENT NO.    : 6,506,974 B2
DATED         : January 14, 2003
INVENTOR(S)   : H. Nakata It is certified that error appears in the above-identified patent and that said Letters Patent is hereby corrected as shown below:

Title page,
Item [56], References Cited, FOREIGN PATENT DOCUMENTS, "60-07614" should be -- 60-67614 --.

Signed and Sealed this

Twelfth Day of August, 2003

JAMES E. ROGAN
*Director of the United States Patent and Trademark Office*